United States Patent [19]

Higgins

[11] 4,285,752
[45] Aug. 25, 1981

[54] AUTOMATIC TAPE LAY-UP SYSTEM

[75] Inventor: Bobby L. Higgins, Dallas, Tex.

[73] Assignee: Camsco, Inc., Richardson, Tex.

[21] Appl. No.: 130,034

[22] Filed: Mar. 13, 1980

[51] Int. Cl.³ .......................................... B32B 31/04
[52] U.S. Cl. ................................ 156/250; 156/256;
  156/264; 156/265; 156/267; 156/350; 156/517;
  156/522; 156/523; 156/538; 156/539; 156/540;
  226/49; 226/109; 226/110; 226/114
[58] Field of Search ............ 156/250, 264, 265, 267,
  156/500, 517, 516, 522, 523, 540, 538, 539, 574,
  577, 256, 350; 226/49, 50, 51, 109, 110, 114

[56] References Cited

U.S. PATENT DOCUMENTS

| 2,026,402 | 12/1935 | Schlemmer | 83/174 |
| 2,746,543 | 5/1956 | Gezich | 83/71 |
| 3,577,297 | 5/1971 | Howard | 156/522 |
| 3,587,378 | 6/1971 | Oppenheim et al. | 83/201.07 |
| 4,033,214 | 7/1977 | Pearl | 83/174 |
| 4,047,457 | 9/1977 | Stubbings | 83/71 |

Primary Examiner—Caleb Weston
Attorney, Agent, or Firm—Richards, Harris, & Medlock

[57] ABSTRACT

An automatic tape laying system (10) for depositing tape (66) in a lay-up (36) on a work surface (14) is provided. The system (10) includes a tape deposit apparatus (26) including a tape supply reel (64) and a cutting device (94). A tape transport module (60) transports tape from the tape supply reel (64) to the cutting device (94). A tape deposit module (62) is provided within tape deposit apparatus (26) and is rotatable between first and second positions for receiving tape (66) from the tape transport module (60). Tape 66 is received in a port (134) of tape deposit module (62) for deposit along a first direction on the work surface (14), and tape (66) is received in a port (148) for deposit along a second direction on the work surface (14). Scrap tape (176) is received in a port (122) for removal.

24 Claims, 5 Drawing Figures

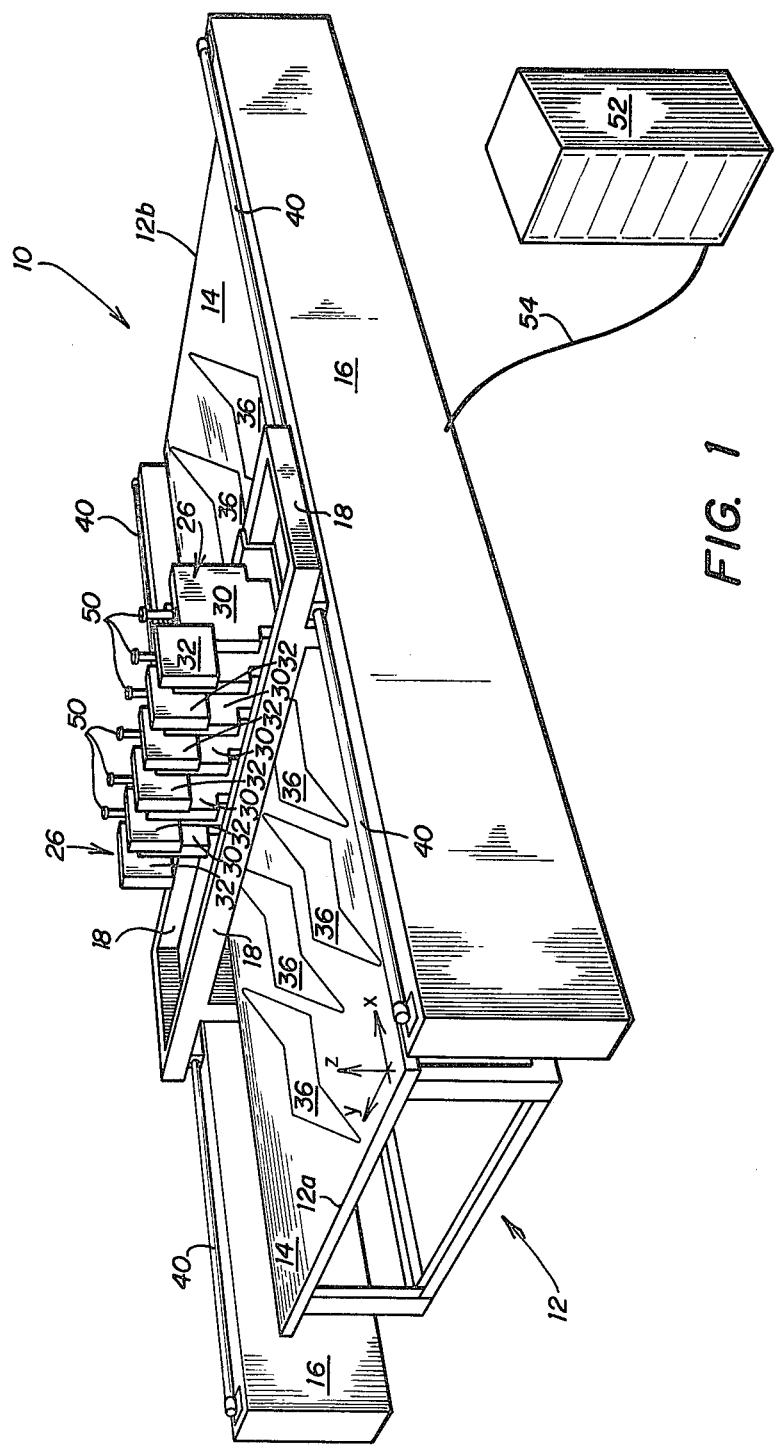

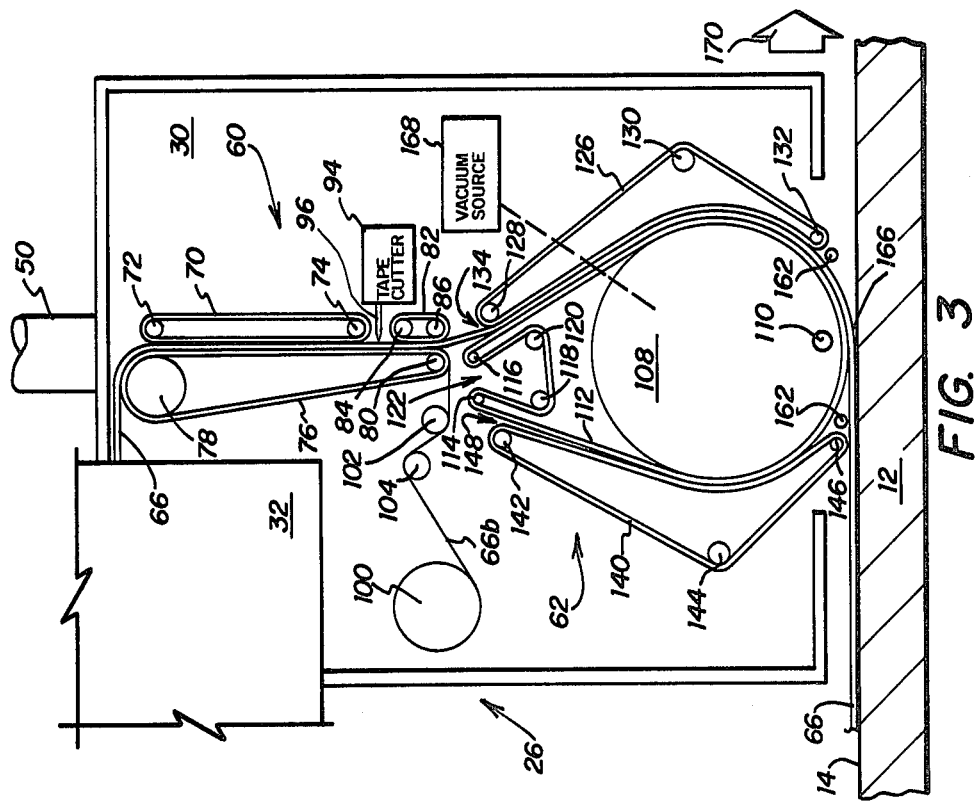
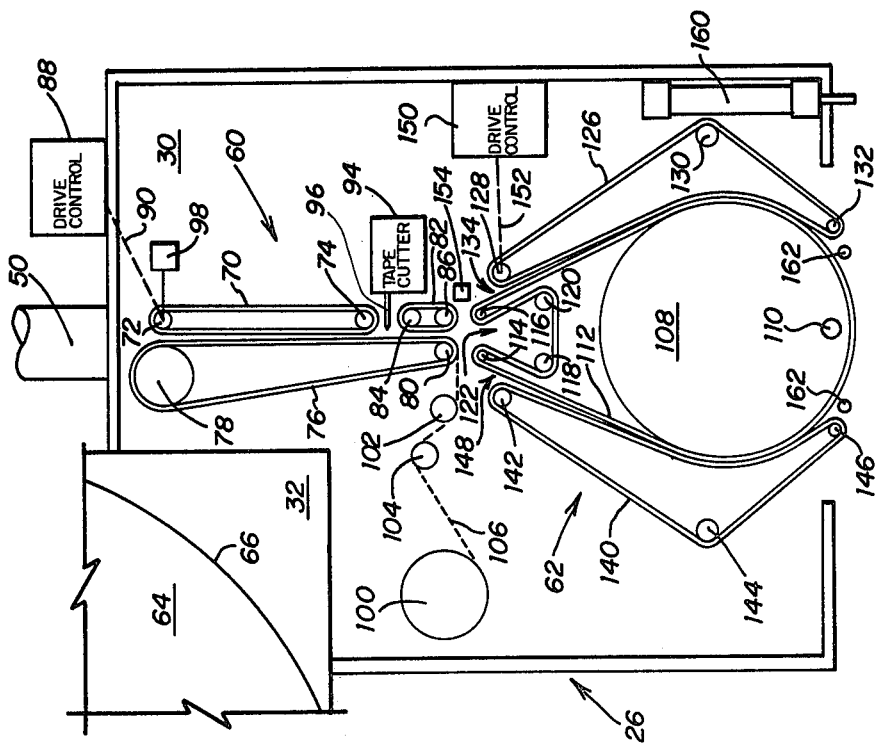

AUTOMATIC TAPE LAY-UP SYSTEM

TECHNICAL FIELD

This invention relates to tape dispensing devices, and more particularly to a tape dispensing system for fabricating piece parts in a lay-up.

BACKGROUND ART

In the fabrication of piece parts having irregular shapes and varying thicknesses it has been known to utilize strips of tape of a single width laid out and cut to form the desired shape and thickness of the piece part. The thickness dimension of the piece part can be controlled by laying up multiple plies of the tape. In this fashion, irregularly shaped parts can be fabricated quickly and easily using a variety of material. For example, material used in the aircraft industry for the fabrication of component parts is reinforced graphite epoxy tape.

Previously developed systems for dispensing tape in a lay-up have been extremely large in size and complex in operation. Such prior systems dispense tape in only one direction along a work surface of a table on which a part is being fabricated. This limitation requires the tape dispensing apparatus to move in one direction along the work surface while dispensing tape and then to be transported back to an initial position along the work surface while not dispensing tape or dry hauling to an initial tape dispensing position. Alternatively, the tape dispensing apparatus must be rotated before tape can be dispensed in the opposite direction of travel along the work surface. Systems which utilize the turn approach or retrace approach are extremely slow and complicated in operation. These systems are also limited in the quantity of tape that can be stored on a supply reel since the entire mechanism is required to be turned during the tape dispensing operation.

Previously developed tape dispensing systems have been limited to cutting tape at right angles to the edges of the tape to avoid generating scrap material. Scrap is generated if the ends of the tape were cut at an angle other than 90° or if cut in an arcuate shape between cut sections of tape to be laid.

A need has thus arisen for an automatic tape lay-up system having the capability of dispensing and laying tape in multiple directions without a retrace or turning operation such that tape can be laid continuously in alternate directions along a work surface. A need has further arisen for an automatic tape lay-up system having scrap tape removal to facilitate end cuts of angular and arcuate configurations. Additionally, such a system must be small in size such that large tape supply reels can be utilized, and be simple in operation and construction for cost considerations and a maintenance free operation.

DISCLOSURE OF THE INVENTION

In accordance with the present invention, an automatic tape lay-up system for automatically cutting and dispensing tape in a lay-up is provided which substantially eliminates the problems heretofore associated with tape dispensing systems.

In accordance with the present invention, an automatic tape laying system for depositing tape in a lay-up on a work surface is provided. The system includes a tape supply reel for storing tape. A cutting device is provided for cutting the tape prior to dispensing. Tape transport is provided for transporting tape from the tape supply reel to the cutting device. Disposed adjacent the cutting device is a tape deposit apparatus pivotable between first and second positions for receiving cut tape. The cut tape received by the tape deposit apparatus is received in the first position for deposit along a first direction on the work surface and is received in the tape deposit apparatus second position for deposit along a second direction on the work surface.

In accordance with another aspect of the present invention, an automatic tape laying system for depositing tape in a lay-up on a work surface includes a tape supply reel for storing tape and a cutting device for cutting tape prior to dispensing. The system further includes tape transport structure for transporting tape from the supply reel to the cutting device. A tape deposit structure includes a drum pivotable between first, second and third positions for receiving tape from the tape transport structure. A first continuous belt is entrained around the drum for movement therearound. The first continuous belt defines a first port aligned with the tape transport structure for receiving tape in the drum first position. A second continuous belt is disposed adjacent the first continuous belt and defines a first tape transfer course. The first and second continuous belts form a second port. The second port is aligned with the tape transport structure for receiving tape in the drum second position for depositing cut tape along a first direction on the work surface. A third continuous belt is disposed adjacent the first continuous belt thereby defining a second tape transfer course. The first and third continuous belts form a third port. The third port is aligned with the tape transport structure for receiving cut tape in the drum third position for depositing cut tape along a second direction on the work surface.

In accordance with yet another aspect of the present invention, an automatic tape laying system for depositing tape in a lay-up on a work surface includes a supply reel mounted for rotation and for receiving a tape carrier web containing tape. A takeup reel is mounted in the system for rotation and for receiving the tape carrier web. The tape carrier web extends from the supply reel to the takeup reel for being wound on the takeup reel. A cutting station is provided and includes a cutting device mounted between the tape supply reel and the tape carrier web takeup reel. The system further includes tape deposit structure being operable between first, second and third positions for selectively receiving cut tape in the second and third positions for selectively causing the cut tape to be deposited on the work surface in either first or second directions. Scrap tape is removed in the first position.

In accordance with another aspect of the present invention, a method for dispensing tape in a lay-up on a work surface includes the step of transporting tape from a supply reel to a cutting zone. The tape is cut at the cutting zone. Cut tape is selectively transferred to a deposit mechanism. The deposit mechanism includes first and second ports and is pivotable for selective alignment of the first and second ports with the cutting zone. The cut tape is transferred through either of the first or second ports to the deposit mechanism. The deposit mechanism is moved to a position adjacent the work surface, and the cut tape is deposited onto the work surface along a direction of movement of the tape laying system.

BRIEF DESCRIPTION OF THE DRAWINGS

For a more complete understanding of the present invention and for further objects and advantages thereof, reference is now made to the following Detailed Description taken in conjunction with the accompanying Drawings in which:

FIG. 1 is a perspective view of the automatic tape laying system of the present inventions;

FIG. 2 is a side elevational view of the present tape transport and deposit modules of the system shown in FIG. 1 with a housing sidewall removed with no tape being illustrated through the system;

FIG. 3 is a side elevational view of the present tape transport and deposit modules illustrating the operation of the present system for deposit of tape in a first direction;

DETAILED DESCRIPTION

Figure 4:
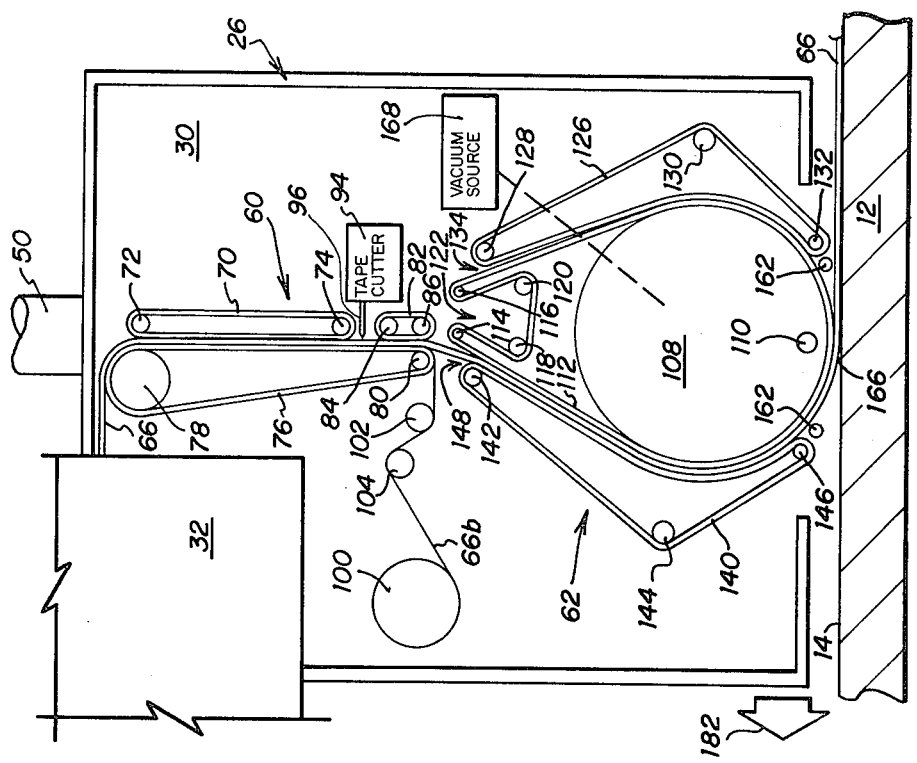
FIG. 4 is a side elevational view of the present tape transport and deposit modules illustrating operation of the present system for scrap tape removal.

Referring to FIG. 1, a perspective view of the automatic tape laying system of the present invention is illustrated and is generally identified by the numeral 10. Automatic tape laying system 10 may be utilized for depositing tape on a work surface for the fabrication of piece parts comprised of strips of tape. The piece parts may be of variable sizes and thicknesses. Automatic tape laying system 10 as shown in FIG. 1 is utilized with a table generally identified by the numeral 12 having ends 12a and 12b and a surface 14. Table 12 is disposed between a main frame structure 16 and below a carriage 18. Table 12 may be of a permanent nature mounted to main frame structure 16 or portable and slidable between main frame structure 16, such that at the completion of fabrication of piece parts, table 12 can be removed from automatic tape laying system 10.

Mounted to carriage 18 are tape deposit apparatus, each generally identified by the numeral 26 of the present invention. FIG. 1 illustrates the use of six tape deposit apparatus 26 of the present invention mounted to carriage 18 for illustrative purposes only. The number of tape deposit apparatus 26 mounted to carriage 18 is selectable depending upon the particular size of piece parts to be fabricated as well as the desired speed of fabrication. Tape deposit apparatus 26 can be operated individually or in a ganged fashion for simultaneous fabrication of piece parts on different areas of surface 14 of table 12 and for alternate deposit of strips of tape during the fabrication of a piece part.

Tape deposit apparatus 26 includes a housing 30 and a tape cassette 32 for storing tape to be cut and deposited. Illustrated on surface 14 of table 12 are piece parts 36 being fabricated by the present automatic tape laying system 10. Piece parts 36 can be fabricated at various sites on surface 14 of table 12 for simultaneous fabrication. The present automatic tape laying system 10 permits multiple ply lay-up deposits of tape such that piece parts 36 can have varying thicknesses over their length. As used herein, the term work surface will mean surface 14 of table 12 in addition to the surface of a piece part 36 to which multiple plies of tape are deposited upon to fabricate variable thicknesses of a piece part 36.

Carriage 18 is supported above main frame structure 16 for slidable movement along rail assembly 40 to traverse table 12 from end 12a to end 12b along the longitudinal or X coordinate direction to traverse table 12. Tape deposit apparatus 26 mounted to carriage 18 may be disposed in a spaced apart configuration to cross table 12 in a direction perpendicular to the movement of carriage 18 or in a Y coordinate direction relative to table 12. The positioning of tape deposit apparatus 26 along the Y coordinate direction is controlled by optical sensors to be subsequently described for sensing the actual position of a deposited strip of tape relative to work surface 14 of table 12, such that subsequent deposits of tape are properly aligned for fabrication of a piece part 36.

The mounting of tape deposit apparatus 26 on carriage 18 permits angular deposits of tape on work surface 14 in that tape deposit apparatus 26 can be angularly rotated on carriage 18 up to an angle of approximately 90° thereby generating piece parts in which tape lay-ups lie in directions other than parallel to the edges of table 12. Tape deposit apparatus 26 also moves perpendicular to work surface 14 of table 12 and piece parts 36 or in a Z coordinate direction relative to table 12 to effectuate deposit of cut tape. The positioning in the Z coordinate direction of tape deposit apparatus 26 is sensitive to the number of plies of tape previously laid up in the fabrication of a piece part 36. This perpendicular motion of tape deposit apparatus 26 is controlled by an air cylinder 50 and a sensor that will be subsequently described.

Positioning of carriage 18, tape deposit apparatus 26 relative to carriage 18 and the perpendicular positioning of tape deposit apparatus 26 relative to work surface 14 and a piece part 36, is controlled through servo motors (not shown) which receive commands from a control computer 52 which contains information defining the shape of a piece part to be laid up and the path of tape deposit to be followed by tape deposit apparatus 26. Commands from control computer 52 are applied to automatic tape laying system 10 by a cable 54.

Referring to FIG. 2, a side elevational view of tape deposit apparatus 26 is illustrated with one sidewall of housing 30 removed for purposes of illustration. Tape deposit apparatus 26 includes a tape transport module, generally identified by the numeral 60 and a tape deposit module, generally identified by the numeral 62. Also illustrated in FIG. 2 is a portion of tape cassette 32 illustrating a portion of a tape supply reel 64 having tape 66 wound thereon. Tape 66 may be of variable widths such as, for example, between one inch and twelve inches. Tape supply reel 64 may store variable amounts of tape such as, for example, between 1000 and 10,000 feet. Tape 66 may comprise, for example, graphite reinforced epoxy in which a tape backing 66b (FIG. 3) is utilized to separate plys of tape on tape supply reel 64.

Tape transport module 60 includes a continuous belt 70. Continuous belt 70 is entrained around rollers 72 and 74. A continuous belt 76 is entrained around rollers 78 and 80 and is disposed parallel to continuous belt 70. A further continuous belt 82 is positioned adjacent continuous belts 70 and 76 and is entrained around rollers 84 and 86. Drive for continuous belts 70, 76 and 82 is provided by a drive control apparatus 88 interconnected to roller 72 by a mechanical linkage 90. Alternatively, either of rollers 74, 78, 80, 84 or 86 may be driven by drive control apparatus 88 to provide drive for continuous belts 70, 76 and 82.

Disposed between continuous belts 70 and 82 is a tape cutter 94 having a blade 96. Tape cutter 94 may comprise, for example, a reciprocating chisel type cutter to impart rectilinear motion to blade 96. Blade 96 may be constructed to permit angular cutoffs of the ends of tape 66 as well as arcuate cutoffs as required for the fabrication of piece parts 36. Disposed adjacent roller 72 is an encoder 98 for accurately measuring the amount of tape transported from tape supply reel 64 to tape cutter 94. Encoder 98 is responsive to rotation of roller 72. The backing of tape 66 is rewound on a takeup reel 100 and passes around rollers 102 and 104 along a path indicated by the dashed line 106.

Tape deposit module 62 includes a tape deposit drum 108 pivotally mounted on a shaft 110 within housing 30 of tape deposit apparatus 26. Tape deposit drum 108 is pivotable between three positions as will subsequently be described with reference to FIGS. 3, 4 and 5. Entrained around tape deposit drum 108 is a continuous belt 112 having a course defined by tape deposit drum 108 and rollers 114, 116, 118 and 120. The path of continuous belt 112 defines a port between rollers 114 and 116 generally identified by the numeral 122.

Tape deposit module 62 further includes a continuous belt 126 which forms a path around rollers 128, 130 and 132. It can be seen that a portion of the path defined by continuous belt 126 coincides with a portion of the path defined by continuous belt 112. The positioning of rollers 116 of continuous belt 112 and roller 128 of continuous belt 126 define a port generally identified by the numeral 134 disposed adjacent port 122. Tape deposit module 62 further includes a continuous belt 140 entrained around rollers 142, 144, and 146. The path of continuous belt 140 lies adjacent a portion of the path of continuous belt 112. The positioning of rollers 114 of continuous belt 112 and roller 142 of belt continuous 140 define a port generally identified by the numeral 148 disposed adjacent port 122. Drive for continuous belts 112, 126 and 140 is provided by a drive control apparatus 150 interconnected by a mechanical link 152 to roller 128. Alternatively, drive control apparatus 150 may be interconnected to any of rollers 114, 116, 118, 120, 128, 130, 132, 142, 144 or 146 to provide belt drive for tape deposit module 62. Disposed adjacent port 134 is an encoder 154 for accurate determination of the length of cut tape passing from tape transport module 60 to tape deposit module 62.

Positioning of tape deposit apparatus 26 in the Z coordinate direction above work surface 14 or the surface of a piece part 36 is under the control of air cylinder 50 interconnected to housing 30 of tape deposit apparatus 26. Air cylinder 50 is controlled by a pressure sensor 160 which senses the height or level of the tape previously laid up on work surface 14 to control the point at which subsequent deposits of strips of tape 66 is made. Continuous belts 70, 76, 82, 112, 126 and 140 may be constructed from Mylar material of 0.003 inches thick.

Mounted adjacent drum 108 within housing 30 are optical sensors 162 for sensing the actual position of a deposited strip of tape relative to work surface 14 of table 12. In response to the sensed position of a deposited strip of tape, tape deposit apparatus 26 moves in the Y coordinate direction to ensure proper alignment of subsequently deposited strips of tape.

The operation of the present automatic tape laying system 10 will now be described with reference to FIGS. 3, 4, and 5 wherein like numerals are utilized for like and corresponding components previously identified. Referring initially to FIG. 3, tape 66 exiting from tape cassette 32 passes over roller 78 and becomes trapped between continuous belts 70 and 76. The motion of continuous belts 70 and 76 transports tape 66 to tape cutter 94 disposed between rollers 74 and 84. Tape cutter 94 operates to cut tape 66 without cutting the backing of tape 66. Tape cutter 94 is operable to cut a tape end/cut-off angle of between 0° and 60°. As shown in FIG. 3, however, at this step in the operation of the present system, tape 66 has not been cut by tape cutter 94 but continues its travel through the cutting zone of blade 96 to continuous belt 82 to become trapped between continuous belts 82 and 76. At a point between rollers 86 and 80, backing 66b of tape 66 is peeled away from tape 66. Backing 66b follows path 106 around rollers 102 and 104 to be rewound on takeup reel 100. Since backing 66b of tape 66 is never severed by tape cutter 94, backing 66b is continuously rewound on takeup reel 100.

FIG. 3 illustrates tape deposit drum 108 of tape deposit module 62 pivoted to a position in which port 134 is aligned below rollers 80 and 86 such that the path of tape 66 without backing 66b is caused to deflect into tape deposit module 62 between continuous belts 126 and 112. Port 134 therefore serves as an entrance port for tape 66 into tape deposit module 62. Due to the driving action of continuous belts 126 and 112, tape 66 is transported from the entrance point of tape deposit module 62 to a deposit point along tape deposit drum 108 below shaft 110 in contact with work surface 14 of table 12. Deposit is effected by air cylinder 50 operating to lower tape deposit apparatus 26 to a deposit point adjacent table 12 indicated by the numeral 166. Tape deposit apparatus 26, prior to deposit, is disposed in a predetermined position above table 12 within carriage 18 (FIG. 1).

In order to ensure proper alignment and deposit of tape 66, a vacuum is applied from a vacuum source 168 to tape deposit drum 108 in order to releasably maintain tape 66 around tape deposit drum 108 in the area between roller 132 and deposit point 166. After tape deposit apparatus 26 has been lowered to deposit point 166 for tape deposit, the vacuum pressure of vacuum source 168 is released to effectuate accurate deposit of tape 66 on work surface 14 of table 12. Tape 66 is then laid out upon work surface 14 by movement of carriage 18 in the direction indicated by arrow 170 toward end 12b of table 12 to lay a strip of tape 66 in the positive X direction with reference to table 12 (FIG. 1).

Referring now to FIG. 4, the position of tape deposit apparatus 26 is illustrated after a length of tape 66 has been deposited. Arrow 174 indicates that tape deposit apparatus 26 is now in its nontape laying position above work surface 14 of table 12. Prior to the laying of a subsequent strip of tape 66, it may be necessary to form an end cut-off at an angle or arcuate configuration such that a piece of scrap tape 176 is generated. If the end cut of this subsequent piece of tape 66 to be laid was perpendicular to the edges of tape 66, no scrap would be generated. The present tape laying system 10 permits the cutting of non-perpendicular end cut-offs because of an important aspect of the present invention, this aspect being scrap removal.

As illustrated in FIG. 4, after tape 66 has been cut, tape deposit drum 108 is pivoted to a position in which port 122 is disposed below rollers 80 and 86. The path of continuous belt 112 entrained around rollers 114, 116, 118 and 120 forms a receptacle 178 to which vacuum pressure is applied from a vacuum source 180 to catch and remove scrap tape 176. After each cut of tape 66 by tape cutter 94, tape deposit drum 108 rotates to the position illustrated in FIG. 4 to collect any scrap tape generated in the cutting process. Scrap tape 176 can then be removed from tape deposit module 62 so as not to interfere with the deposit of a subsequent piece of tape 66 on work surface 14.

Figure 5:
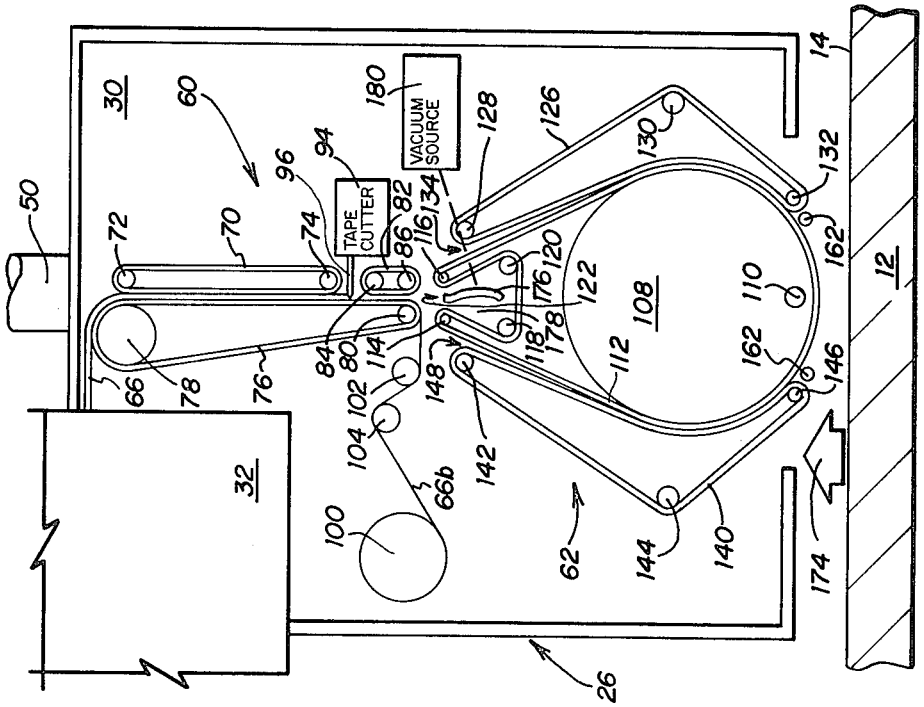
FIG. 5 is a side elevational view of the present tape transport and deposit modules illustrating operation of the present system for deposit of tape in a second direction opposite to the direction shown in FIG. 3.

FIG. 5 illustrates the position of tape deposit drum 108 in a position for the deposit of tape 66 in the direction indicated by arrow 182 in the direction opposite the direction of deposit indicated by arrow 170 (FIG. 3) or in the negative X coordinate direction from end 12b to end 12a of table 12 (FIG. 1). It can be seen in FIG. 5 that tape deposit drum 108 has pivoted such that port 148 lies below rollers 80 and 86 such that tape 66 is deflected into port 148 between rollers 114 and 142. Tape 66 thereafter follows a path between continuous belts 112 and 140, being trapped therebetween. Tape 66 continues its path until reaching point of deposit 166 on work surface 14 of table 12 at which time tape deposit apparatus 26 lowers, under the control of pressure sensor 160 and air cylinder 50, to effectuate deposit of tape 66. After the desired length of tape 66 has been deposited, tape cutter 94 performs a cutting operation. Tape deposit apparatus 26 then assumes the position as illustrated in FIG. 4 in which port 122 is disposed below rollers 80 and 86 to effectuate scrap removal of the leading end of the next subsequent strip of tape 66 to be laid up or deposited on work surface 14 of table 12. It can be seen that after each deposit of tape 66, either in the direction indicated by arrow 170 (FIG. 3) or arrow 182 (FIG. 5), tape deposit drum 108 will assume the position as illustrated in FIG. 4.

It therefore can be seen that tape deposit apparatus 26 operates to continuously lay tape 66 in both the positive and negative X coordinate directions from end 12a to end 12b or end 12b to end 12a of table 12 without physically rotating in the direction tape is being dispensed. The present automatic tape laying system 10 and tape deposit apparatus 26 deposits tape in both directions of traverse across a work area eliminating the need for retrace or dry hauling of the dispensing apparatus from one end of a work surface to the other end of a work surface. Thus it can be appreciated that tape can be deposited twice as fast as a dry haul system in which tape can only be laid in one direction along a work surface. The multiple use of tape deposit apparatus 26 mounted on carriage 18 permits several piece parts 36 to be fabricated simultaneously at different locations on work surface 14. Tape deposit apparatus 26 also permits deposit of tape in directions angularly disposed to the edges of table 12 by rotating within carriage 18. Additionally, the multiple arrangement of tape deposit apparatus 26 permits deposit of alternating strips of tape on a single piece part to form varying thicknesses simultaneously as the piece part 36 is fabricated. Because extremely small lengths of tape can be cut and dispensed by the present automatic tape laying system 10, any angular shaped work piece can be laid up from short segments of tape 66. It can be seen from FIG. 2, that the shortest length of tape that the present automatic tape laying system 10 can accommodate is defined by the distance between the plane defined by rollers 80 and 86 and the plane defined by rollers 114 and 116. This is the distance a cut piece of tape 66 must traverse before being trapped by continuous belt 112 and either of continuous belts 126 or 140 within tape deposit module 62.

It therefore can be seen that the present automatic tape laying system for depositing tape in the lay-up on a work surface provides for the deposit of tape in either of two directions without the need for turning the deposit mechanism or retracing the path of deposit. Additionally, the present system includes a scrap tape evacuation system to permit angular end cut-offs and arcuate shapes.

Whereas the present invention has been described with respect to specific embodiments thereof, it will be understood that various changes and modifications will be suggested to one skilled in the art and it is intended to encompass such changes and modifications as fall within the scope of the appended claims.

I claim:
1. An automatic tape laying system for depositing tape in a lay-up on a work surface comprising:
   a tape supply reel for storing tape;
   cutting means for cutting tape;
   tape transport means for transporting tape from said tape supply reel to said cutting means;
   tape deposit means pivotable between first and second positions for continuously receiving tape in said first and second positions from said cutting means; and
   said tape being received in said tape deposit means first position for deposit along a first direction on the work surface and said tape being received in said tape deposit means second position for deposit along a second direction on the work surface.
2. The system of claim 1 and further including:
   means for pivoting said tape deposit means between said first and second positions.
3. The system of claim 1 wherein said transport means includes:
   first and second continuous belt means disposed adjacent one another, such that tape is received between said first and second continuous belt means for transport to said cutting means.
4. The system of claim 1 wherein said tape deposit means further includes scrap tape removal means.
5. The system of claim 1 wherein said directions of tape deposit are opposite one another.
6. The system of claim 1 wherein said tape deposit means includes:
   first continuous belt means defining a first transfer course and forming a first port selectively aligned with said tape transport means;
   second continuous belt means disposed adjacent said first continuous belt means and defining a second transfer course, said first and second continuous belt means forming a second port disposed from said first port;
   third continuous belt means disposed adjacent said first continuous belt means and defining a third transfer course, said first and third continuous belt means forming a third port disposed from said first port;
   said second port being selectively aligned to receive tape in said tape deposit means first position, such that tape is received between said first and second continuous belt means for transport to be deposited on the work surface; and
   said third port being selectively aligned to receive tape in said tape deposit means second position, such that tape is received between said first and third continuous belt means for transport to be deposited on the work surface.

7. The system of claim 6 wherein said tape deposit means further includes:
vacuum means connected to said first port for effecting scrap tape removal from said cutting means.

8. The system of claim 6 and further including:
drum means entrained by said first continuous belt means and pivotable between said tape deposit means first and second positions.

9. The system of claim 8 and further including:
vacuum means applied to said drum means for releasably maintaining tape in contact with said drum means prior to deposit on the work surface.

10. The system of claim 1 and further including:
means for sensing the work surface to thereby control the deposit of tape on the work surface.

11. An automatic tape laying system for depositing tape in the lay-up on a work surface comprising:
a tape supply reel for storing tape;
cutting means for cutting tape;
tape transport means for transporting tape from said tape supply reel to said cutting means;
tape deposit means including drum means pivotable between first, second and third positions for receiving tape from said tape transport means;
first continuous belt means entrained around said drum means for movement therearound and defining a first port, said first port being aligned with said tape transport means for receiving cut tape in said drum means first position;
second continuous belt means disposed adjacent said first continuous belt means and defining a first tape transfer path, said first and second continuous belt means forming a second port, said second port being aligned with said tape transport means for receiving tape in said drum means second position for tape deposit along a first direction on a work surface;
third continuous belt means disposed adjacent said first continuous belt means and defining a second tape transfer path, said first and third continuous belt means forming a third port, said third port being aligned with said tape transport means for receiving tape in said drum means second position for tape deposit along a second direction on the work surface; and
means for pivoting said drum means between said first, second and third positions.

12. The system of claim 11 and further including:
vacuum means for applying vacuum pressure to said first port for effecting scrap tape removal from said cutting means in said drum means first position.

13. The system of claim 11 and further including:
vacuum means for applying vacuum pressure to said drum means for releasably maintaining tape in contact with said drum means prior to deposit on the work surface.

14. The system of claim 11 and further including:
means for sensing the work surface to thereby control deposit of tape on the work surface.

15. The system of claim 11 wherein said tape transport means includes:
fourth and fifth continuous belt means disposed adjacent one another, such that tape is received between said fourth and fifth continuous belt means from said tape supply reel for transport to said cutting means.

16. An automatic tape laying system for depositing tape in a lay-up on a work surface comprising:
a tape carrier web containing tape;
a supply reel mounted for rotation and for receiving said tape carrier web containing tape;
a takeup reel mounted for rotation and for receiving said tape carrier web;
said tape carrier web extending from said supply reel to said takeup reel for being wound on said takeup reel;
a cutting station including means for cutting tape;
means for moving said tape carrier web from said supply reel to said takeup reel and to said cutting station;
tape deposit means including drum means being operable between first, second and third positions for selectively receiving tape in said second and third positions for causing tape to be continuously deposited on the work surface in either first or second directions; and
means for pivotally moving said tape deposit means between said first, second and third positions.

17. The system of claim 16 wherein said tape deposit means includes:
vacuum means for applying vacuum pressure to said tape deposit means in said first position for effecting scrap tape removal from said cutting station.

18. The system of claim 16 wherein said tape deposit means includes:
first continuous belt means entrained around said drum means for movement therearound and defining a first port, said first port being aligned with said tape transport means for receiving cut tape in said drum means first position;
second continuous belt means disposed adjacent said first continuous belt means and defining a first tape transfer path, said first and second continuous belt means forming a second port, said second port being aligned with said tape transport means for receiving tape in said drum means second position for tape deposit along a first direction on a work surface;
third continuous belt means disposed adjacent said first continuous belt means and defining a second tape transfer path, said first and third continuous belt means forming a third port, said third port being aligned with said tape transport means for receiving tape in said drum means second position for tape deposit along a second direction on the work surface; and
means for pivoting said drum means between said first, second and third positions.

19. An automatic tape laying system for depositing tape in a lay-up on a work surface supported on a table having opposed ends comprising:
a traverse carriage supported above the table for controlled movement longitudinally along the surface of the table;
a plurality of tape dispensing means mounted for controlled movement along said transverse carriage, such that tape is deposited by said plurality of tape dispensing means simultaneously at plural locations on the work surface as said carriage traverses the table:
means for moving said plurality of tape dispensing means on said traverse carriage for depositing tape at predetermined angular directions;

means for controlling lateral displacement of said plurality of tape dispensing means on said traverse carriage for controlling horizontal spacing between strips of deposited tape; and each of said plurality of tape dispensing means includes:

a tape supply reel for storing tape;

cutting means for cutting tape;

tape transport means for transporting tape from said tape supply reel to said cutting means;

tape deposit means pivotable between first and second positions for receiving tape in said first and second positions from said cutting means; and said tape being received in said tape deposit means first position for deposit along a first direction on the work surface and said tape being received in said tape deposit means second position for deposit along a second direction on the work surface.

20. A method for depositing tape in a lay-up on a work surface comprising:

transporting tape from a supply reel to a cutting zone;

pivotally moving between first and second positions a tape deposit apparatus having first and second ports for selective alignment with said cutting zone;

selectively transferring tape through said first port of said tape deposit apparatus in said first position for depositing tape along a first direction on the work surface;

selectively transferring tape through said second port of said tape deposit apparatus in said second position for depositing tape along a second direction on the work surface;

transferring tape from said first and second ports of said tape deposit apparatus to a position adjacent the work surface; and depositing said tape on the work surface along said first and second directions.

21. The method of claim 20 and further including the step of:

sensing the location of the work surface.

22. The method of claim 20 and further including the steps of:

cutting said tape in said cutting zone to generate scrap tape; and removing said scrap tape by applying vacuum pressure between said first and second ports of said tape deposit apparatus.

23. The method of claim 20 and further including the step of:

retaining said tape on said tape deposit apparatus using vacuum pressure.

24. The method of claim 23 and further including the step of:

discontinuing the application of said vacuum pressure from said tape dispensing apparatus prior to tape deposit on the work surface.

* * * * *